F. E. SALLMAN.
PARAFFINING AND STEAM CLEANING DEVICE.
APPLICATION FILED JULY 23, 1917.

1,263,120.

Patented Apr. 16, 1918.

Witness
A. I. Hague

Inventor
F. E. Sallman
By Orwig & Bair

UNITED STATES PATENT OFFICE.

FRANK EVERETT SALLMAN, OF CORYDON, IOWA.

PARAFFINING AND STEAM-CLEANING DEVICE.

1,263,120.  Specification of Letters Patent.  Patented Apr. 16, 1918.

Application filed July 23, 1917. Serial No. 182,363.

*To all whom it may concern:*

Be it known that I, FRANK EVERETT SALLMAN, a citizen of the United States, and resident of Corydon, in the county of Wayne and State of Iowa, have invented a certain new and useful Paraffining and Steam-Cleaning Device, of which the following is a specification.

The object of my invention is to provide a paraffining and steam cleaning device adapted to clean milk cans, butter tubs or the like, and by slight adjustment of the parts paraffin the interior of butter tubs and so on.

More particularly it is the object of my invention to provide a device adapted to be connected to a steam pipe, and having opposite conducting tubes so constructed and arranged that one may discharge at one point for cleaning the interior of the receptacle with steam, and the other being so arranged as to be used for discharging at another point for paraffining the interior of butter tubs or the like.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1:
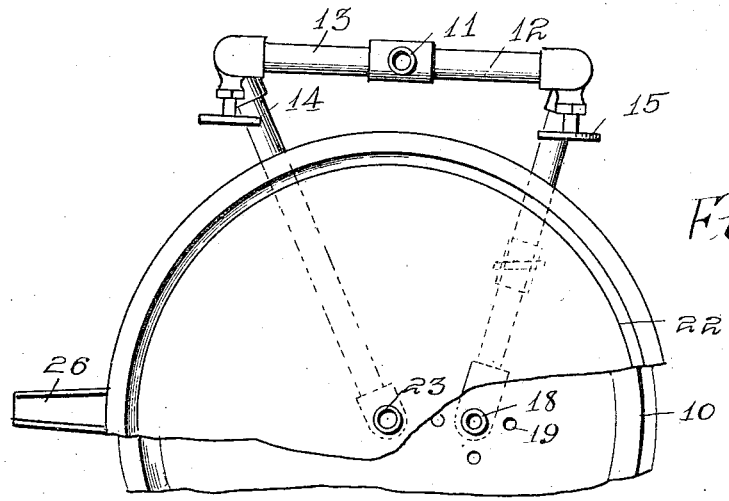
Figure 1 shows a top or plan view partly broken away of a part of a device embodying my invention.

In the accompanying drawings, I have used the reference numeral 10 to indicate generally a receptacle or pan open at its outer ends. 11 indicates a steam pipe designed to be connected with a source of steam supply and having at its discharge end the branches 12 and 13.

In the branches 12 and 13 are controlling valves 14 and 15.

Mounted on the bottom of the pan or receptacle 10 is a cup or the like 16, mounted in the bottom of which is a nozzle 17 which communicates with the branch 12. In the lowest part of the branch 12 is a drain cock 12ª.

Mounted in the bottom of the pan 10 is a tube 18 extending above and below said bottom, and extending just above the discharge end of the nozzle 17. The lower end of the tube 18 is preferably somewhat flaring, as shown in Fig. 2.

In the bottom of the pan 10, spaced from the tube 18 are openings 19, so arranged that material passing therefrom will be discharged into the cup 16.

Extending through the bottom of the pan 10 is another tube 20 connected at its lower end with the branch tube or pipe 13, and having screw-threads 21 at its upper end. The upper end of the tube 20 is arranged below the level of the upper edge of the pan 10.

Figure 2:
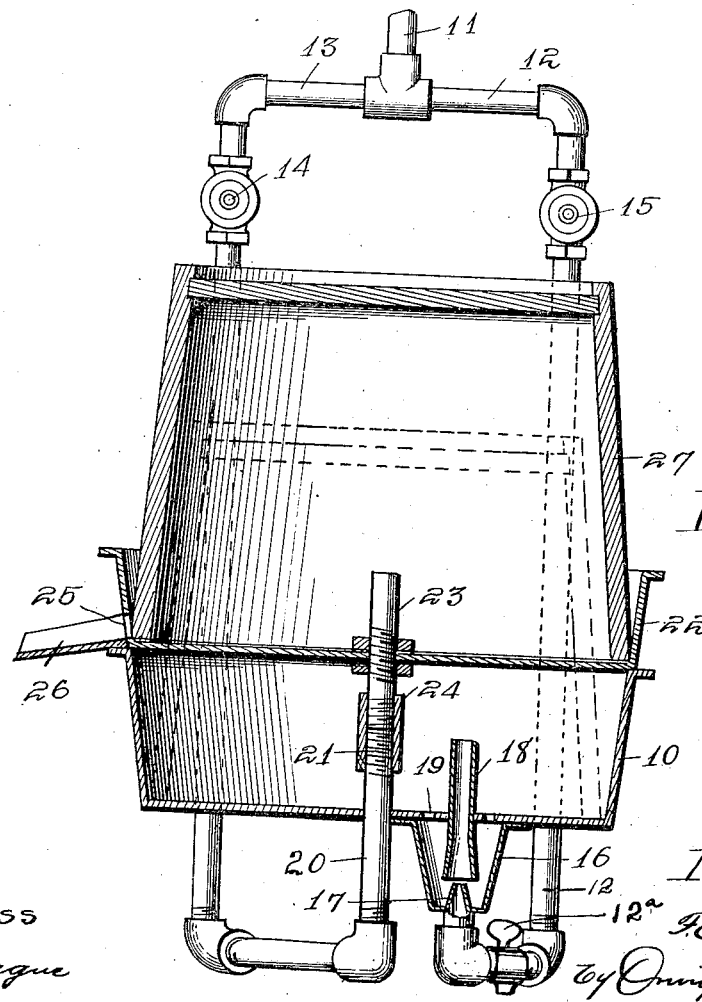
Fig. 2 shows a central, vertical, sectional view through the same.

I provide a second pan 22 of such size as to set upon the upper edge of the pan 10, as shown in Fig. 2.

Extending through the bottom of the pan 22, and secured thereto is a pipe 23 having screwed on its lower end a screw-threaded sleeve 24 adapted to be screwed on to the screw-threaded end 21 of the pipe 20. The pan 22 is provided in its side wall, near its bottom, with a discharge opening 25. A spout 26 is arranged on the outside of the pan 22 to carry off water or the like discharged through the opening 25.

In the practical use of my improved device, the parts are installed, with the exception of the pan 22, as shown in Fig. 2.

When it is desired to steam and clean the interior of a cream can or butter tub 27, or the like, the pan 22 is placed above the pan 10 and the sleeve 24 is secured to the tube 20 until the bottom of the pan 22 rests on the upper edge of the pan 10. The cream can or butter tub 27 is inverted with its open end resting on the upper edge of the pan 10, whereupon the valve 14 may be opened and a blast of steam driven through the pipes 11, 13, 20 and 23 into the interior of the tub 27 or cream can or other receptacle to be cleaned. It will be seen that the hot steam will thoroughly cleanse the interior of the receptacle, and that the water of condensation may flow off through the opening 25 or the spout 26.

The receptacle 27 may then be removed and the pan 22 rotated for unscrewing the sleeve 24 from the tube 20. The tub 27 or the like may then be inverted with its open end received in and resting upon the bottom of the pan 10, as illustrated by dotted lines in Fig. 2.

The pan 10 is filled with a certain amount of paraffin and the valve 15 is opened. The hot steam passing into the pan 10 will melt the paraffin which will flow downwardly into the cup 16 through the opening 19 and will be taken up by the passing blast of steam and forced through the tube 18 and blown in a thin coating over the entire interior of the butter tub or the like 27.

The valve 15 may be shut off and the butter tub removed when the paraffining has been completed.

It will be seen that my device is a comparatively simple and inexpensive construction, and that the same steam supply may be utilized in one mechanism for cleaning cream cans and the interior of butter tubs and the like, and for paraffining receptacles of the kind used in butter factories and creameries.

Some changes may be made in the construction and arrangement of the parts of my improved device without departing from the essential features and purposes of my invention, and it is my intention to cover by the claims of the patent to be issued on my application any modified forms of structure or use of mechanical equivalents, which may be reasonably included within the scope of my claims.

I claim as my invention:

1. In a device of the class described, a supply pipe, branches connected therewith, a receptacle open at its upper end, a tube connected with one of said branches, extending through the bottom of said receptacle, a second receptacle, a tube mounted in the bottom thereof, a removable member for connecting said last two mentioned tubes, with the bottom of said second receptacle resting upon the top of the first receptacle whereby the first tube may be used with the first receptacle or extended for use with the second receptacle.

2. In a device of the class described, a supply pipe, branches connected therewith, a receptacle open at its upper end, a tube connected with one of said branches, extending through the bottom of said receptacle, a second receptacle, a tube mounted in the bottom thereof, means for connecting said last two mentioned tubes, with the bottom of said second receptacle resting upon the top of the first receptacle, said second receptacle having a discharge opening in its side wall, and a spout leading from said discharge opening.

3. In a device of the class described, a supply pipe, branches connected therewith, a receptacle open at its upper end, a tube connected with one of said branches, extending through the bottom of said receptacle, a cup arranged below the bottom of said receptacle, said receptacle having openings through its bottom above said cup, the other of said branches being arranged to discharge upwardly into said cup, a tube mounted in the bottom of said receptacle, and extending downwardly into said cup, and upwardly into said receptacle.

Des Moines, Iowa, May 17, 1917.

FRANK EVERETT SALLMAN.

Copies of this patent may be obtained for five cents each, by addressing the "Commissioner of Patents, Washington, D. C."